(12) United States Patent
Story

(10) Patent No.: US 6,535,485 B1
(45) Date of Patent: Mar. 18, 2003

(54) METHODS AND SYSTEMS FOR AN IMPROVED RELIABILITY PACKET NETWORK

(75) Inventor: Roger E. Story, Bridgewater, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/410,581

(22) Filed: Oct. 1, 1999

(51) Int. Cl.[7] .............................................. G01R 31/08
(52) U.S. Cl. ...................................................... 370/231
(58) Field of Search ................................ 370/231–236, 370/397, 352, 389–395, 260, 229–232, 468; 356/354–356; 355/474–480, 329, 468; 229, 230–235, 410, 381, 401, 433–436, 314, 338, 252; 455/445, 422, 560; 375/222; 708/224; 725/116, 95; 709/219

(56) References Cited

U.S. PATENT DOCUMENTS

| | | | | |
|---|---|---|---|---|
| 5,313,454 A | * | 5/1994 | Bustini et al. ............... | 370/231 |
| 5,436,899 A | * | 7/1995 | Fujino et al. ................ | 370/433 |
| 5,457,687 A | * | 10/1995 | Newman .................... | 370/232 |
| 5,608,733 A | * | 3/1997 | Vallee et al. ................. | 370/394 |
| 5,621,728 A | * | 4/1997 | Lightfoot et al. ........... | 370/397 |
| 5,963,543 A | * | 10/1999 | Rostoker et al. ............ | 370/232 |
| 6,005,851 A | * | 12/1999 | Craddock et al. ........... | 370/329 |
| 6,014,694 A | * | 1/2000 | Aharoni et al. ............. | 709/219 |
| 6,018,515 A | * | 1/2000 | Sorber ........................ | 370/229 |
| 6,046,985 A | * | 4/2000 | Aldred et al. ............... | 370/252 |
| 6,075,798 A | * | 6/2000 | Lyons et al. ................. | 370/474 |
| 6,104,705 A | * | 8/2000 | Ismail et al. ................. | 370/260 |
| 6,128,280 A | * | 10/2000 | Jamoussi et al. ............ | 370/230 |
| 6,141,686 A | * | 10/2000 | Jackowski et al. .......... | 709/224 |
| 6,256,323 B1 | * | 7/2001 | Benayoun et al. .......... | 370/474 |
| 6,263,016 B1 | * | 7/2001 | Bellenger et al. ........... | 375/222 |

* cited by examiner

Primary Examiner—Wellington Chin
Assistant Examiner—Prenell Jones
(74) Attorney, Agent, or Firm—Joseph Giordano; William A. Schoneman

(57) ABSTRACT

Methods and systems for improving network reliability in a packet-based network by applying a higher level of compression to information transmitted from an interface device in the event network congestion is detected. A network congestion level is detected for the network. If this network congestion level exceeds a selected level, the interface device is directed to apply a higher level of compression. The interface devices transmission rate is thus reduced, and accordingly, the network congestion decreased.

20 Claims, 3 Drawing Sheets

METHODS AND SYSTEMS FOR AN IMPROVED RELIABILITY PACKET NETWORK

BACKGROUND OF THE INVENTION

The present invention relates generally to communications, and more particularly, to a method and system for providing reliable packet and cell-like networks.

Reliability in present networks is obtained by one of two approaches: (1) building the network with extremely reliable and concomitantly extremely expensive components, or (2) building the network so that excess capacity is present. This excess capacity is deployed in a diverse manner so that failures in the back up capacity are statistically uncorrelated with failures in the main working components. As such, both of these approaches are expensive.

Further, network reliability is presently obtained by some modems that include dynamic controls such as XON and XOFF. These controls help prevent buffer overflows in the network device closest to the modem. Also, some current modems are capable of supporting multiple protocols and transmission rates and can communicate with another modem in the network to determine a mutually compatible protocol for the given network conditions. However, these existing modems apply their protocol choices to all transmissions (compressible and non-compressible), and do not alter their compression rates to address major network failures. Therefore, it is desirable to have a method and system for overcoming the disadvantages of the prior art.

DESCRIPTION OF THE INVENTION

Accordingly, the present invention is directed to a communication system that substantially obviates one or more of the problems due to limitations and disadvantages of the prior art.

In accordance with the purposes of the invention, as embodied and broadly described herein, the invention includes a packet-based network for communicating information between a first endpoint and a second endpoint, including a plurality of paths connecting the first endpoint and the second endpoint, a controller for determining if the network is congested, and a processor for compressing, according to a congestion-level of compression, the information transmitted from the first endpoint to the second endpoint when the determined network congestion level exceeds a selected level.

In another aspect the invention includes a method for communicating information between a first endpoint and a second endpoint over a packet-based network having a plurality of paths connecting the first endpoint and the second endpoint, including the steps of determining a network congestion level, transmitting information from the first endpoint to the second endpoint, and applying a congestion-level of compression to compress the information transmitted from the first endpoint to the second endpoint if the determined network congestion level exceeds a selected level.

In another aspect the invention includes an apparatus for transmitting information to an endpoint over a network having a plurality of paths connecting the apparatus and the endpoint, including means for transmitting the information to the endpoint, means for receiving a network congestion signal indicating when a network congestion level for the network exceeds a selected level, and congestion-level compression means for compressing the information transmitted to the endpoint when the network congestion level exceeds the selected level.

In yet another aspect the invention includes a method for communicating information between a first endpoint and a second endpoint over a packet-based network having a plurality of paths connecting the first endpoint and the second endpoint, including the first endpoint receiving a network congestion signal indicating whether a network congestion level for the network exceeds. a selected level, the first endpoint transmitting information to the second endpoint, and the first endpoint applying a congestion-level of compression to compress the information transmitted to the second endpoint if the network congestion level exceeds the selected level.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
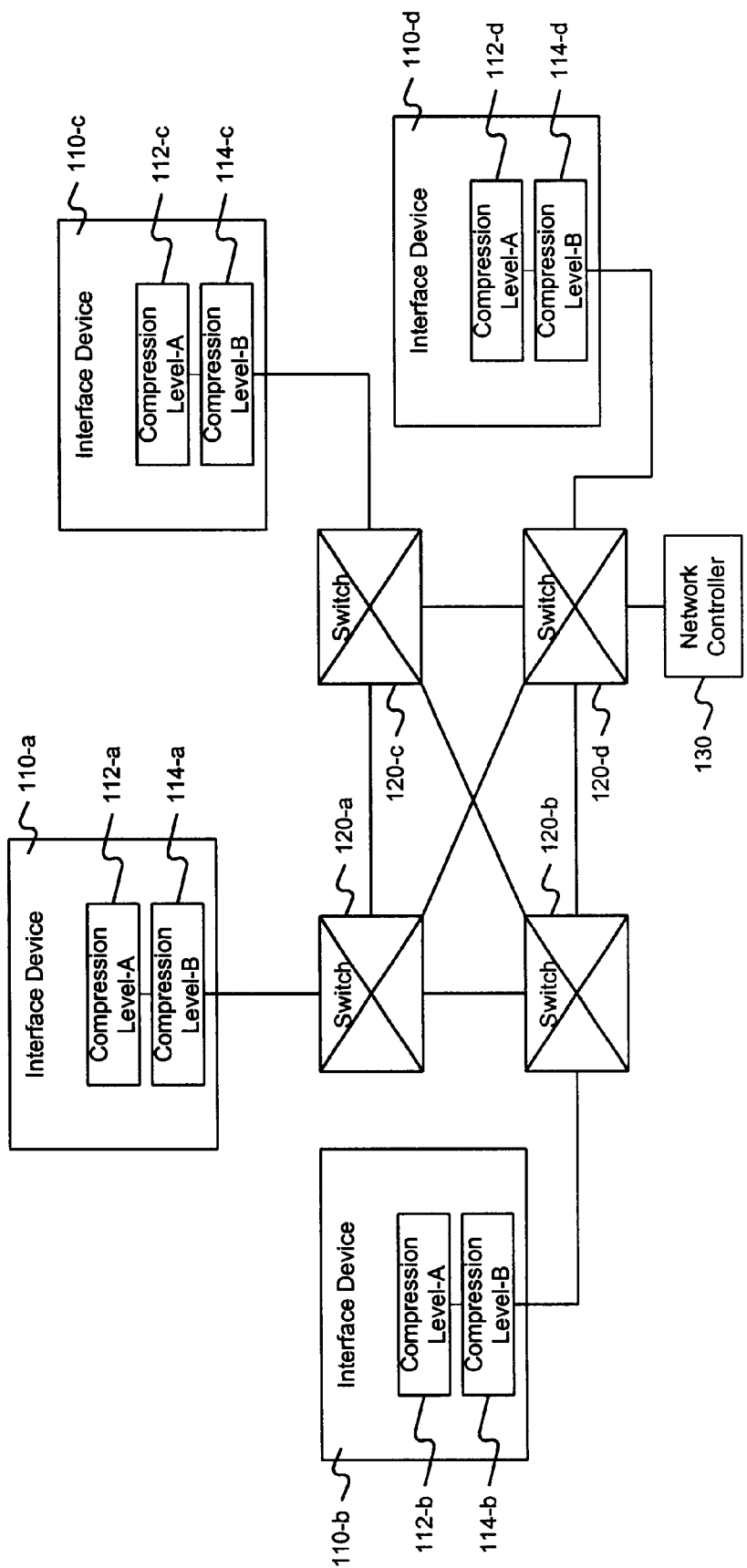
FIG. 1 illustrates a packet-based network, consistent with the invention.

FIG. 1 illustrates a packet-based network 100 according to an embodiment of the invention that includes a network controller 130 and a plurality of switches 120-a to 120-d for interconnecting various interface devices 110-a to 110-d. As shown, there are multiple diverse paths connecting the various interface devices 110-a to 110-d through the packet-based network 100. For example, interface device 110-a can connect to interface device 110-d through switch 120-a, switch 120b, and switch 120-d, or through switch 110-a, switch 110-c, and switch 120-d. The packet-based network 100 can be any network for packet, packet-like, or cell-like communications, including, but not limited to, an Asynchronous Transfer Mode (ATM) network or Fiber Distributed Data Interface (FDDI) network. Accordingly, in this application the terms "packet" and "cell" are used interchangeably.

The interface devices 110-a to 110-d of this embodiment transmit and receive compressible services, such as voice and video over the network 100, and may be, for example, modems. As will be obvious to one of skill in the art, the invention can be used with any compressible service.

As illustrated, each interface device 110-a to 110-d preferably includes at least two levels of compression. The first level of compression 112-a to 112-d is sometimes referred to as the nominal compression and is set by the user according to the quality of transmission desired. The second level of compression 114-a to 114-d is provided to significantly reduce the packet transmission rate in the event of congestion or a network failure, but still provide a practical albeit less desirable quality of service.

The network controller 130 of this embodiment detects network failures and congestion and transmits this information to the interface devices 110-a to 110-d. Thus, in the event of network congestion, the network controller 130 instructs the interface devices to use the higher compression rate. This frees capacity on the network, allowing communications to continue but at a lower quality. After the network is repaired or the traffic on the network reduces, the network controller 130 then instructs the interface devices 110-a to 110-d that the higher level compression is no longer necessary. The interface devices 110-a to 110-d then can turn off the higher level compression. The network controller 130 may be, for example, a computer, such as a PC or server, or any other type of system for obtaining information about the network and issuing commands to address problems. Further, the network controller 130 may use protocols or systems such as the Simple Network Management Protocol (SNMP) or Telcordia's Network Monitoring and Analysis (NMA™) System.

The specific compression used as well as the signaling method used to communicate between the network controller and the interface devices is immaterial to the invention as broadly described herein. These details may be determined as part of any proprietary implementation or relegated to the work of the standards bodies. In some cases, explicit communication between the interface devices and the network controller may be used. For example packetized messages might be addressed individually to each interface device, ordering a change in compression, or a broadcast message might be used.

In yet other embodiments, communications between the network controller and the interface devices may be more implicit or indirect. For example, if all interface devices are connected to the network via a network modem or other suitable gateway, the network controller may simply instruct the network modem to reduce the maximum transmission rate by using a higher level of compression. The network modem then would turn on the higher level of compression, thus negating the need for the customer modems to individually turn on the higher level of compression and the need to include this capability. In another embodiment, the network modem could provide intelligence and depending on the situation turn-on higher levels of compression for communications emanating from individual interface devices according to a priority scheme, thus negating the need for the interface devices themselves to turn on the higher level of compression.

In an embodiment, the receiving interface device 110-a to 110-d is capable of detecting the protocol change and appropriately decompressing the signal. Depending on the protocol and compression scheme used there might be no need for the receiving modem to do anything differently, it might have to infer the change from the signal it receives, or it might be necessary for the two interface devices to actually exchange messages.

Figure 2:
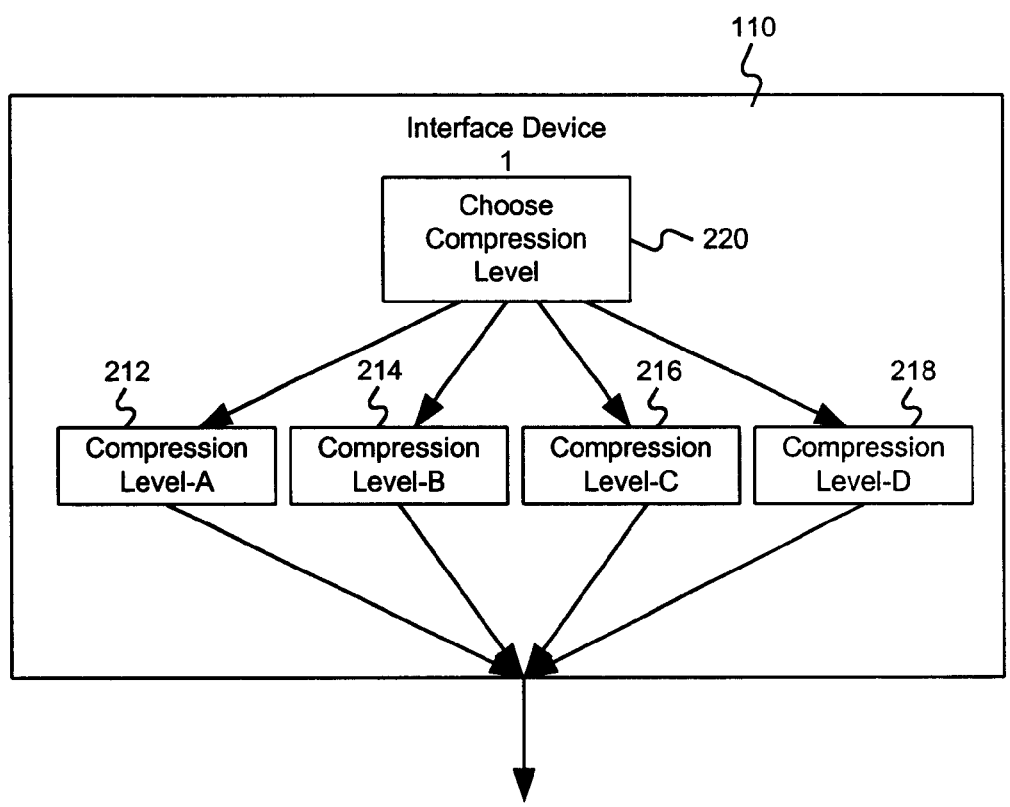
FIG. 2 illustrates an interface device capable of using multiple levels of compression, consistent with the invention.

Further, as illustrated in FIG. 2, interface devices can include even higher levels of compression. As illustrated, the interface device 110 includes a first level of compression 212, a second level of compression 214, a third level of compression 216, a fourth level of compression 218, and a means for choosing the level of compression 220. The means for choosing the level of compression is preferably a computer. In addition to selecting the level of compression, this computer may also perform other tasks, such as receiving and sending data using a specific protocol.

As in the above described embodiment, the first level of compression in this embodiment is set by the user according to the users desired quality of transmission. The network controller 130 then can send a message to the interface in the event the network is marginally congested. Upon receipt of this instruction, the interface device 110 can switch to the second level of compression 214, which only mildly compresses the traffic emanating from this interface device 110. Thus, the quality of transmission is only marginally reduced.

In the event, the network controller 130 detects a need for more compression by the interface device, it can instruct the interface device to switch to the third level of compression. This further reduces the amount of traffic sent from the interface device 110 at the cost of a further decreased quality of transmission.

Further, if the network controller 130 detects that an even greater amount of compression is needed, it can instruct the interface device to switch to the fourth level of compression, which further reduces the amount of traffic at the expense of further reducing the quality of transmission. Further, as will be obvious to one skilled in the art, all four levels of compression can be combined in a single compression component of an interface device.

Thus, through this mechanism the amount of compression used is determined by the network controller depending on the need for compression. Therefore, the quality of transmission need be reduced only as much as necessary for the level of network congestion.

In another embodiment, the system supports a priority scheme, in which lower priority packets are dropped or delayed before higher priority packets. In the event of network congestion, the network controller directs the interface devices to use the higher level compression. However, some interface devices may elect not to use the higher level compression. Thus, in this embodiment, a higher transmission priority is provided to packets from interface devices that use the higher compression level. Thus, those interface devices that choose not to compress will be the first to be blocked by the network.

Further, priority levels can be used in conjunction with multiple levels of compression. For example, the network controller can direct the interface devices to use a higher level compression. An interface device, however, can choose to use compression, although at a lower level than directed by the network controller. Thus, the packets emanating from the various interface devices can be assigned different priority levels based on their compression level. For example, those choosing not to compress at all are assigned the lowest priority level, while those using the priority level directed by the network controller are assigned the highest priority level, and those choosing some compression level in between are assigned a priority level in between.

Further, in another embodiment, the network controller, depending on the given network conditions, can individually direct specific interface devices to turn on the higher levels of compression. For example, if only one link is congested in the network, and two interface devices are communicating over an un-congested path, the network controller need not instruct these interface devices to turn on the higher levels of compression. Instead, the network controller can instruct only those interface devices contributing to the congestion to turn on the higher level of compression.

In one embodiment, the interface device converts a compressible analog signal to digital format. A program running on a processor or computer in the interface device then compresses the digital signal using the specified compression level. When the interface device is instructed to switch to a different compression level, the computer/processor simply stops using the currently active compression program and begins compressing the digital signal using a program implementing the selected compression level. Further, as will be obvious to one skilled in the art, in other embodiments, the various compression levels can be serially connected, as illustrated in FIG. 1, whereby the interface device turns on and off the additional compression levels as instructed by the network controller.

Figure 3:
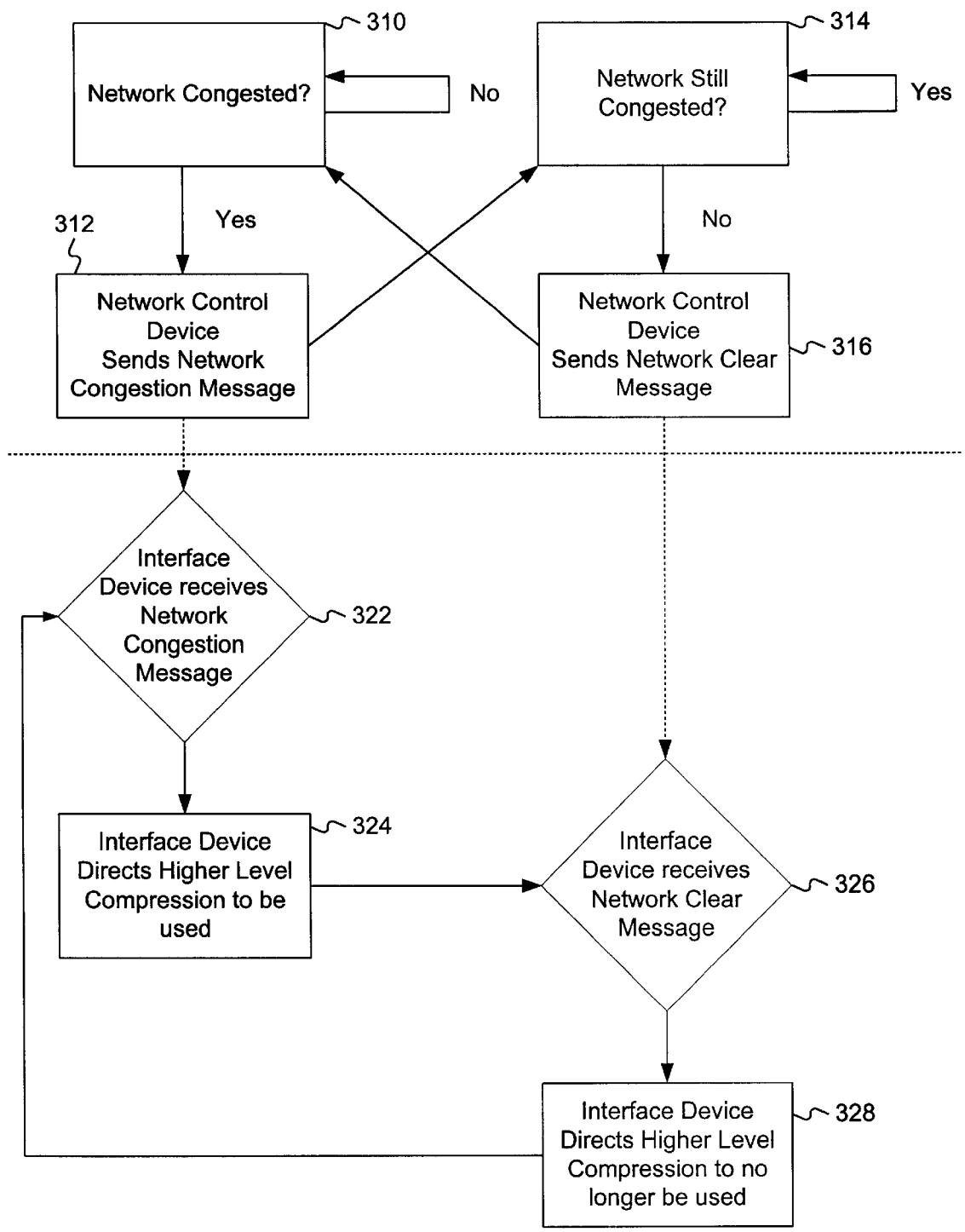
FIG. 3 is a flow chart of a method for managing the traffic on the network, consistent with the invention.

FIG. 3 illustrates a flow chart for an embodiment of the invention that includes two levels of compression. As with the above described embodiments, the first level of compression is set according to the quality of transmission desired by the user. Assuming the network is not congested, the first step is that the network controller checks the network to determine if the network is congested 310. If not, the network controller continues to monitor the network. If the network controller detects a problem, it transmits a network congestion message to the interface devices instructing them to turn on the higher level of compression 312. When the interface device receives this message 320, it begins using the higher level compression 322. The network controller then continues to monitor the network 314, and when it determines that the higher level compression is no longer needed, it sends a message to the interface devices indicating this 316. The interface device then receives this message 326 and turns off the higher level compression 328, and thus begins transmitting information using only the user specified first level of compression.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A packet-based network for communicating information between a first endpoint and a second endpoint, comprising:
   a plurality of paths connecting the first endpoint and the second endpoint;
   a controller for determining if the network is congested; and
   a first processor for compressing, according to a congestion-level of compression, the information transmitted from the first endpoint to the second endpoint when the network is determined to be congested.

2. The network of claim 1, further including
   a second processor for compressing, according to a nominal-level of compression that is based on a quality of service parameter, the information transmitted from the first endpoint to the second endpoint.

3. The network of claim 1, wherein the information transmitted from the first endpoint to the second endpoint is assigned a priority level according to a level of compression used by the first processor.

4. The network of claim 1, wherein there are a plurality of congestion levels of compression.

5. The network of claim 1, further including a plurality of paths for connecting a plurality of endpoints.

6. A method for communicating information between a first endpoint and a second endpoint over a packet-based network having a plurality of paths connecting the first endpoint and the second endpoint, the method comprising:
   determining if the network is congested;
   transmitting information from the first endpoint to the second endpoint; and
   applying a congestion-level of compression to compress the information transmitted from the first endpoint to the second endpoint if the network is determined to be congested.

7. The method of claim 6, further comprising:
   applying a nominal-level of compression to compress the information transmitted from the first endpoint to the second endpoint in accordance with a quality of service parameter.

8. The method of claim 6, further comprising:
   assigning a level of priority to the information transmitted from the first endpoint to the second endpoint according to a level of compression used in applying the congestion-level of compression.

9. The method of claim 6, wherein applying the congestion-level of compression includes
   determining one of a plurality of congestion levels according to a level of network congestion, and
   using the determined congestion level to compress the information.

10. An apparatus for transmitting information to an endpoint over a network having a plurality of paths connecting the apparatus and the endpoint, the apparatus comprising:
    means for transmitting the information to the endpoint;
    means for receiving a network congestion signal indicating the network is congested; and
    congestion-level compression means for compressing the information transmitted to the endpoint when the network is congested.

11. The apparatus of claim 10, further including
    nominal-level compression means for compressing the information transmitted to the endpoint in accordance with a quality of service parameter.

12. The apparatus of claim 10, wherein the information transmitted from the apparatus to the endpoint is assigned a priority level according to a level of congestion used by the congestion-level compression means.

13. The apparatus of claim 10, wherein the congestion level compression means includes means for compressing the information according to one of a plurality of compression levels.

14. A method for communicating information between a first endpoint and a second endpoint over a packet-based network having a plurality of paths connecting the first endpoint and the second endpoint, comprising:
    the first endpoint receiving a network congestion signal indicating whether the network is congested;
    the first endpoint transmitting information to the second endpoint; and
    the first endpoint applying a congestion-level of compression to compress the information transmitted to the second endpoint if the network is congested.

15. The method of claim 14, further including
    the first endpoint applying a nominal-level of compression to compress the information transmitted to the second endpoint in accordance with a quality of service parameter.

16. The method of claim 14, further including the first endpoint assigning a level of priority to the information transmitted from the first endpoint to the second endpoint according to a level of compression used in applying the congestion-level of compression.

17. The method claim 14, further including the first endpoint determining one of a plurality of congestion levels according to a level of network congestion, and using the determined congestion level to compress the information.

18. A communications network comprising:

a plurality of switches interconnected by transmission means for transmitting compressible packets of information;

a plurality of interface means each connected to a switch, each including
means for providing at least two levels of compression for information input to said interface means;
means for processing a network congestion signal, and
means for transmitting compressed information to another interface device; and a network monitoring and control system for monitoring network congestion and for providing control signals to the interface means when the network is congested to manage the compression levels for transmitted information.

19. A packet-based network for communicating information between a first endpoint and a second endpoint, comprising:

a plurality of paths connecting the first endpoint and the second endpoint;

a controller for determining if the network is congested; and a processor for compressing, according to a congestion-level of compression, the information transmitted from the first endpoint to the second endpoint when the network is determined to be congested, and for compressing, according to a nominal-level of compression that is based on a quality of service parameter, the information transmitted from the first endpoint to the second endpoint.

20. A packet-based network for communication information between a first endpoint and a second endpoint, comprising:

a plurality of paths connecting the first endpoint and the second endpoint;

means for determining if the network is congested; and congestion level compression means for compressing the information transmitted from the first endpoint to the second endpoint when the network is determined to be congested.

* * * * *